(12) United States Patent
Park

(10) Patent No.: US 9,136,924 B2
(45) Date of Patent: Sep. 15, 2015

(54) TRANSMITTING DEVICE AND A METHOD OF COMMUNICATING THEREWITH, AND RECEIVING DEVICE AND A METHOD OF COMMUNICATING THEREWITH

(75) Inventor: Kyoungmin Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 94 days.

(21) Appl. No.: 13/807,706

(22) PCT Filed: Jul. 1, 2011

(86) PCT No.: PCT/KR2011/004835
§ 371 (c)(1),
(2), (4) Date: Dec. 28, 2012

(87) PCT Pub. No.: WO2012/005476
PCT Pub. Date: Jan. 12, 2012

(65) Prior Publication Data
US 2013/0114763 A1 May 9, 2013

(30) Foreign Application Priority Data
Jul. 5, 2010 (KR) ........................ 10-2010-0064573

(51) Int. Cl.
*H04B 7/02* (2006.01)
*H04B 7/04* (2006.01)
*H04B 7/06* (2006.01)

(52) U.S. Cl.
CPC ............ *H04B 7/0456* (2013.01); *H04B 7/0413* (2013.01); *H04B 7/0469* (2013.01); *H04B 7/0626* (2013.01)

(58) Field of Classification Search
CPC .. H04B 7/0639; H04B 7/0456; H04B 7/0469; H04B 7/0634; H04B 7/0413; H04B 7/0452; H04B 7/0626
See application file for complete search history.

(56) References Cited

U.S. PATENT DOCUMENTS

| | | | |
|---|---|---|---|
| 2009/0257383 A1 | 10/2009 | Lee et al. | |
| 2010/0048233 A1 | 2/2010 | Kim et al. | |
| 2010/0322176 A1* | 12/2010 | Chen et al. | 370/329 |
| 2011/0032839 A1* | 2/2011 | Chen et al. | 370/252 |
| 2011/0034192 A1* | 2/2011 | Lim et al. | 455/501 |
| 2011/0116563 A1 | 5/2011 | Vitthaladevuni et al. | |
| 2011/0206024 A1* | 8/2011 | Lee et al. | 370/338 |
| 2011/0249713 A1* | 10/2011 | Hammarwall et al. | 375/220 |
| 2011/0268068 A1* | 11/2011 | Jian et al. | 370/329 |
| 2011/0274188 A1* | 11/2011 | Sayana et al. | 375/260 |
| 2011/0305263 A1* | 12/2011 | Jongren et al. | 375/219 |
| 2012/0003945 A1* | 1/2012 | Liu et al. | 455/115.1 |
| 2012/0127948 A1* | 5/2012 | Chung et al. | 370/329 |

FOREIGN PATENT DOCUMENTS

WO 2009-125956 10/2009

OTHER PUBLICATIONS

International Search Report dated Dec. 28, 2011 issued for related International Application No. PCT/KR2011/004835.

* cited by examiner

*Primary Examiner* — Kenneth Lam
(74) *Attorney, Agent, or Firm* — H.C. Park & Associates, PLC

(57) ABSTRACT

An embodiment of the present invention relates to a wireless communication system, and more specifically relates to a wireless communication system using multi-input and multi-output (MIMO) antennas in all transmission and reception terminals.

28 Claims, 10 Drawing Sheets

ND A METHOD
TRANSMITTING DEVICE AND A METHOD OF COMMUNICATING THEREWITH, AND RECEIVING DEVICE AND A METHOD OF COMMUNICATING THEREWITH

CROSS-REFERENCE TO RELATED APPLICATION

This application is the National Stage Entry of International Application No. PCT/KR2011/004835, filed on Jul. 1, 2011, and claims priority from and the benefit of Korean Patent Application No. 10-2010-0064573, filed on Jul. 5, 2010, all of which are hereby incorporated by reference for all purposes as if fully set forth herein.

BACKGROUND

1. Field

The present invention relates to a wireless communication system, and more particularly, to a wireless communication system that uses multiple input multiple output (MIMO) in both a transmitting end and a receiving end.

2. Discussion of the Background

As communication systems have developed, various wireless terminals have been utilized by consumers, such as companies and individuals.

A current mobile communication system, such as 3GPP, LTE (Long Term Evolution), LTE-A (LTE Advanced), and the like, may be a high capacity communication system capable of transmitting and receiving various data such as image data, wireless data, and the like, beyond providing a sound-based service. Accordingly, there is a desire for a technology that transmits high capacity data, which is comparable with a wired communication network. Also, the system is required to minimize loss of information and increase transmission efficiency of the system so as to enhance performance of the system.

SUMMARY

In accordance with an aspect of the present invention, there is provided a communication method of a transmitting device including a first precoder and a second precoder, the method including: determining first information to restrict a precoding matrix from being used as a first precoding matrix of the first precoder, and second information to restrict a precoding matrix from being used as a second precoding matrix of the second precoder in a corresponding codebook with respect to each layer; and transmitting, to a receiving device, codebook restricting information including at least one of the determined first information and second information.

In accordance with another aspect of the present invention, there is provided a transmitting device, the device including: a layer mapper to map a codeword to a layer; a precoder including a first precoder and a second precoder that performs precoding on a data symbol corresponding to the codeword mapped to the layer by the layer mapper, using a first precoding matrix and a second precoding matrix selected from a corresponding codebook; and an antenna array to transmit signals output from the precoder, and the codeword includes at least one of first information to restrict a precoding matrix from being used as the first precoding matrix and second information to restrict a precoding matrix from being used as the second precoding matrix in the corresponding codebook with respect to each layer.

In accordance with another aspect of the present invention, there is provided a communication method of a receiving device in a wireless communication system, the method including: receiving codebook restricting information including at least one of first information to restrict a precoding matrix from being used as a first precoding matrix and second information to restrict a precoding matrix from being used as a second precoding matrix for each layer; and transmitting, to a transmitting device, $1^{st}$ channel status information indicating a first precoding matrix and $2^{nd}$ channel status information indicating a second precoding matrix, the first precoding matrix and the second precoding matrix being selected, based on the codebook restricting information, from among precoding matrices that are not restricted from being used as the first precoding matrix or the second precoding matrix in a codebook.

In accordance with another aspect of the present invention, there is provided a receiving device in a wireless communication system, the device including: an antenna array to receive, as codebook restricting information, at least one of first information to restrict a precoding matrix from being used as a first precoding matrix and first information to restrict a precoding matrix from being used as a second precoding matrix with respect to each layer; and a channel information feedback device to transmit, to a transmitting device, $1^{st}$ channel status information indicating a first precoding matrix and $2^{nd}$ channel status information indicating a second precoding matrix, the first precoding matrix and the second precoding matrix being selected, based on the codebook restricting information, from among precoding matrices that are not restricted from being used as the first precoding matrix of the second precoding matrix in a codebook.

DETAILED DESCRIPTION OF THE ILLUSTRATED EMBODIMENTS

Figure 1:
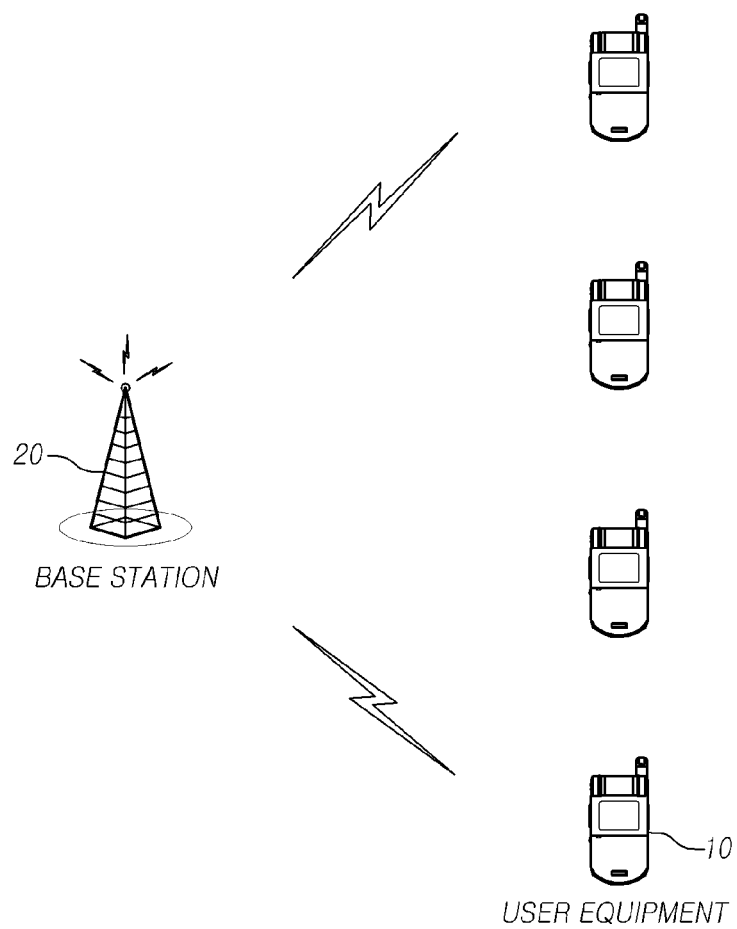
FIG. 1 is a block diagram illustrating a wireless communication system according to embodiments of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 is a block diagram illustrating a wireless communication system according to embodiments of the present invention.

The wireless communication system may be widely installed so as to provide various communication services such as voice data, packet data, and the like.

Referring to FIG. 1, the wireless communication system may include a user equipment (UE) 10 and a base station (BS) 20.

The user equipment 10 may be an inclusive concept indicating a user terminal utilized in a wireless communication, including a UE (User Equipment) in WCDMA, LTE, HSPA, and the like, and an MS (Mobile Station), a UT (User Terminal), an SS (Subscriber Station), a wireless device and the like in GSM.

The base station 20 or a cell may generally refer to a station where communication with the user equipment 10 is performed, and may also be referred to as a Node-B, an eNB (evolved Node-B), a BTS (Base Transceiver System), an access point, a relay node, and the like.

In the specifications, the user equipment 10 and the base station 20 are used as two inclusive transceiving subjects to embody the technology and technical concepts described in the specifications, and may not be limited to a predetermined term or word.

An embodiment of the present invention may be applicable to an asynchronous wireless communication scheme that is advanced through GSM, WCDMA, and HSPA, to be LTE (Long Term Evolution) and LTE-advanced, and may be applicable to a synchronous wireless communication scheme that is advanced through CDMA and CDMA-2000, to be UMB. Embodiments of the present invention may not be limited to a specific wireless communication scheme, and may be applicable to all technical fields to which a technical idea of the present invention is applicable.

The wireless communication system according to embodiments of the present invention may support an uplink and/or downlink HARQ (Hybrid Automatic Repeat request), and may use a CQI (channel quality indicator) for link adaptation. Also, a multiple access scheme for downlink transmission and a multiple access scheme for uplink transmission may be different from each other. For example, a downlink may use OFMDA (Orthogonal Frequency Division Multiple Access) and an uplink may use SC-FDMA (Single Carrier-Frequency Division Multiple Access).

To support high-speed information transmission for the user, the wireless communication system may consider using a Multiple Input Multiple Output (MIMO) scheme that transfers information through the same band using an antenna array including a multi-antenna.

To embody an effective MIMO system, a MIMO wireless communication system may need to provide, to a transmitting device, information associated with a propagation channel or information associated with a precoder or a precoding matrix (hereinafter referred to as a precoding matrix) appropriate for a propagation channel, to increase transmission capacity. In this example, the former requires a large amount of feedback overhead, whereas the latter requires a relatively small amount of feedback overhead.

In the latter case, each of the user equipment 10 and the base station 20 stores a codebook that defines N available precoding matrices, and expresses an index or an indicator indicating or indexing (corresponding to) each precoding matrix, and identification. Each user equipment 10 selects a precoding matrix appropriate for a propagation channel, and transmits an index indexing the selected precoding matrix to the base station 20. The base station 20 receives precoding matrix indices from each user equipment 10, and selects a MIMO mode or a user equipment or performs precoding based on the received precoding matrix indices.

In this example, as a size of a codebook becomes larger since a number of available precoding matrices is large, the precoding performance of the base station 120 increases. However, an amount of feedback overhead of the user equipment 10 required for reporting the precoding matrices or corresponding indices to the base station 20 may be increased. Therefore, when a large size codebook is used, a codebook restriction or a codebook subset restriction that restricts at least one precoding matrix in a codebook may need to be used for more effective precoding.

The codebook restriction is a scheme that generates a codebook including various precoding matrices, selects a precoding matrix to be used/not used in the codebook for each cell or each user equipment, and uses different codebooks for each cell or each user equipment based on codebook restricting information (hereinafter referred to as "codebook restricting information") associated with a precoding matrix to be not used. When the codebook restriction scheme is used, the whole wireless communication system has a large size codebook, but a codebook that is used by each cell or each user equipment is configured of subsets of the codebook, and has a small size, and is configured of only precoding matrices appropriate for a given environment and thus, a precoding gain may be increased.

For example, when downlink MIMO transmission between the base station 20 and the user equipment 10 simultaneously performs transmission with respect to up to 4 layers, the user equipment 10 may transfer, to the base station 20 using a rank indicator (RI), a number of layers that the user equipment 10 is capable of receiving. In this example, 16 precoding matrices may be designated for each rank during the downlink MIMO transmission between the base station 20 and the user equipment 10, and a total of 64 precoding matrices may be configured as shown in Table 1.

TABLE 1

| | | PMI | | | |
|---|---|---|---|---|---|
| RI | 0 | 1 | 2 | ... | 15 |
| 1 | a0 | a1 | a2 | ... | a15 |
| 2 | a16 | a17 | a18 | ... | a31 |
| 3 | a32 | a33 | a34 | ... | a47 |
| 4 | a48 | a49 | a50 | ... | a63 |

In a case in which the codebook restriction is used, when whether a precoding matrix is to be used is determined for each of the 64 precoding matrices and codebook restricting information is transmitted based on a bitmap format that designates whether each precoding matrix is to be used using 1 bit, a total of 64 bits may be required. For example, a corresponding order of an available precoding matrix is expressed to be 1, and a corresponding order of an unavailable precoding matrix is expressed to be 0, as shown in [001010010 . . . 010].

The user equipment 10 may report, to the base station 20 as channel status information, 64 indices corresponding to the total of 64 precoding matrices using a total of 6 bits. In this example, when a codebook restriction that restricts the use of 32 precoding matrices from among the 64 precoding matrices is used, a number of information to be distinguished by 6 bits may be decreased from 64 to 32 and thus, a degree of reliability of a feedback signal may be increased. The user equipment 10 may decrease a number of bits that expresses the indices corresponding to the precoding matrices to 5 bits so as to reduce an amount of feedback overhead of the channel status information.

In addition, the use of precoding matrices that are predicted to cause inter-cell interference may be restricted by the codebook restriction and thus, the inter-cell interference may be prevented in advance. In particular, when a beamforming like precoding that is based on a location of each user equipment is performed, a user equipment located in a cell edge may cause serious inter-cell interference. To prevent the inter-cell interference in advance, a codebook restriction may be performed for each cell and thus, the inter-cell interference may be controlled.

The base station 20 may use a multistage precoder including at least two precoders. The codebook restriction that restricts a precoding matrix to be used for each precoder may also be applicable, when the multistage precoder is used. In this example, a number of precoding matrices is generally increased and a number of bits to be used for codebook restricting information for the codebook restriction may also be increased.

In particular, a high signaling and feedback overhead may be required to support high speed information transmission in an uplink or a downlink and thus, a number of bits that the base station 20 uses to inform each user equipment 10 of the codebook restriction may need to be reduced.

The wireless communication system according to embodiments of the present invention has been described. Hereinafter, with reference to FIGS. 2 and 3, a process will be described in which a base station and a user equipment exchange codebook restricting information and channel status information in a wireless communication system when a multistage precoder is used in a case of codebook restriction.

Figure 2:
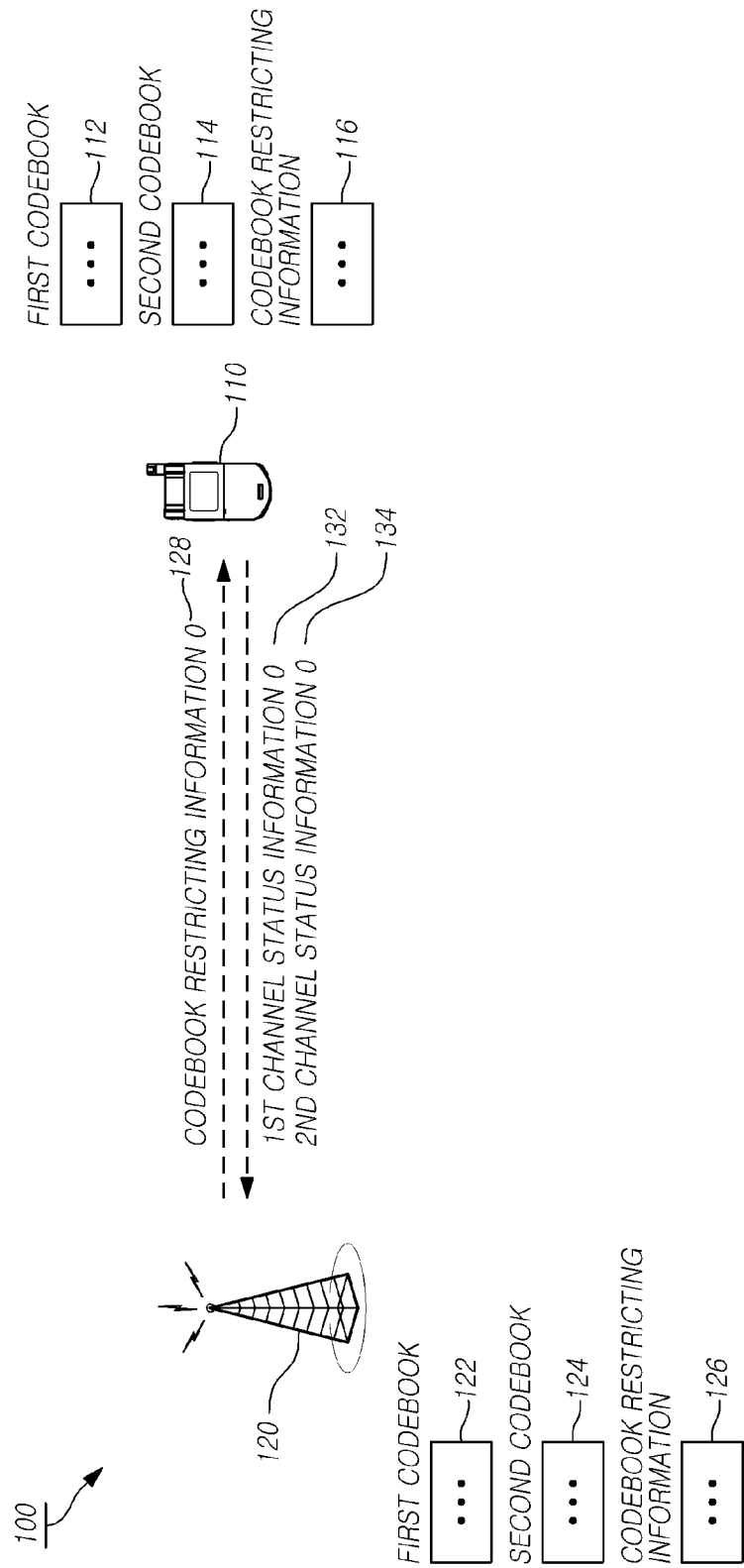
FIG. 2 is a diagram illustrating a wireless communication system in which a base station and a user equipment exchange codebook restricting information and channel status information in a case of codebook restriction.

FIG. 2 illustrates a wireless communication system in which a base station and a user equipment exchange codebook restricting information and channel status information in a case of codebook restriction.

Referring to FIG. 2, a wireless communication system 100 may include the base station 120 and may include at least one user equipment existing in the wireless communication system 100, for example, n user equipments 110, like the wireless communication system of FIG. 1. Although the user equipments 110 may correspond to user equipments that are currently being connected or that attempt additional connection, a single user equipment is illustrated in FIG. 2 for ease of descriptions.

The base station 120 includes a multistage precoder including at least two precoders, that is, first and second precoders. The base station 120 stores a first codebook 122 that expresses N first precoding matrices to be used for the first precoder and first indices indexing the first precoding matrices and a second codebook 124 that expresses M second precoding matrices to be used for the second precoder and second indices indexing the second precoding matrices.

The base station stores a restriction book 126 including ranks and an index (hereinafter referred to as a restriction index) corresponding to each pair of a first index and a second index with respect to each rank. The base station 120 determines a precoding matrix to be used/not used for each cell or for each user equipment, and may transmit, to the user equipment 110, codebook restricting information 128 associated with the precoding matrix to be not used. In this example, the codebook restricting information 128 includes first information that restricts a precoding matrix from being used as a first precoding matrix and second information that restricts a precoding matrix from being used as a second precoding matrix in the first and second codebooks 122 and 124 with respect to each layer.

Figure 3:
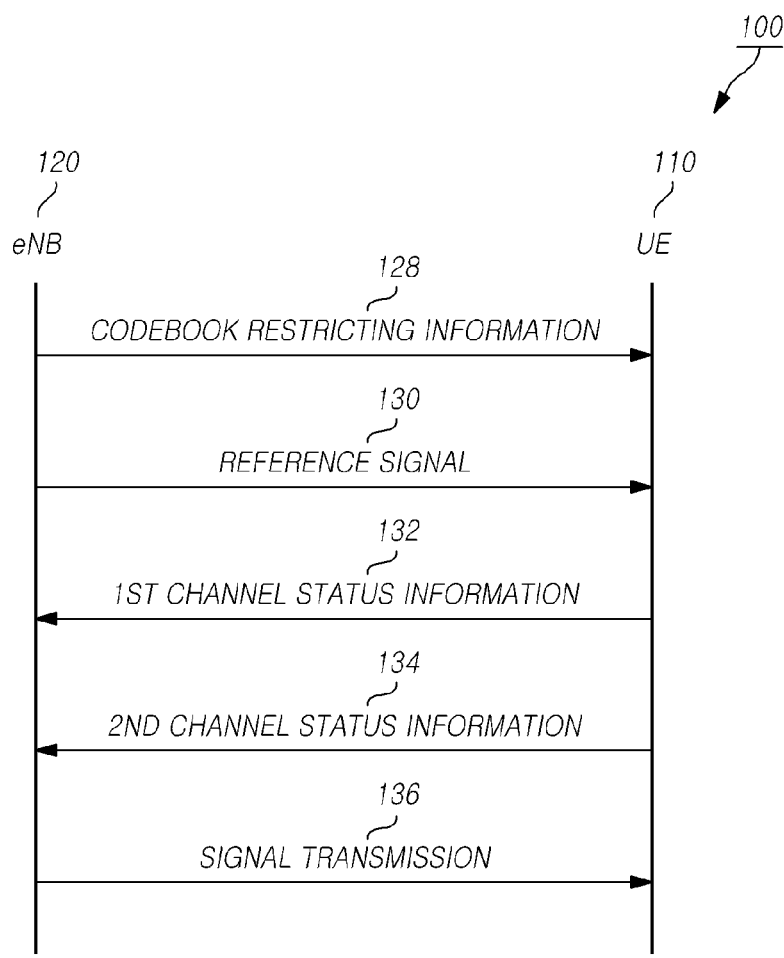
FIG. 3 is a flowchart further illustrating a reference signal and signal transmission in the wireless communication system that exchanges codebook restricting information and channel status information of FIG. 2.

FIG. 3 is a flowchart further illustrating a reference signal and signal transmission in the wireless communication system that exchanges codebook restricting information and channel status information of FIG. 2.

Referring to FIG. 3, for transmission and reception of data between the user equipment 110 and the base station 120, the base station 120 at a transmitter side transmits a reference signal 130 as further illustrated in FIG. 3, and the user equipment 110 at a receiver side estimates a channel using the reference signal 130. For example, in a case of downlink transmission, the user equipment 110 may estimate a downlink channel. In particular, in a case of OFDM transmission, the user equipment 110 may estimate a channel of each subcarrier. Conversely, in a case of uplink transmission, the base station 120 may estimate an uplink channel.

For the channel estimation, a predetermined signal or symbol may be inserted into a frequency-domain grid at regular or irregular intervals. In this example, the predetermined signal or symbol may be referred to as a reference signal or a reference symbol, a pilot symbol, and the like. In the specifications, the predetermined signal or symbol is referred to as a reference signal, but this may not be limited thereto. The reference signal 130 may not be used for only the estimation of the frequency-domain channel, but may be used for estimation of a location required for wireless communication between a user equipment and a base station, transmission and reception of control information, transmission and reception of scheduling information, transmission and reception of feedback information, and the like.

There may be various types of reference signals for downlink or uplink transmission, and new reference signals for various purposes have been defined and discussed. For example, reference signals for the uplink transmission may include a DM-RS (Demodulation RS), an SRS (Sounding RS), and the like. Reference signals for the downlink transmission may include a DM-RS (Demodulation RS), CRS (Cell-specific RS), an MBSFN RS, a UE-specific RS, and the like. Also, a CSI-RS is used as a reference signal that a base station transmits to obtain channel status information (CSI) of a center cell or adjacent cells from the user equipment 110 in a case of downlink transmission. The CSI-RS may be used for reporting a CQI (Channel Quality Indicator)/PMI (Precoder Matrix Indicator)/RI (Rank Indicator), and the like. The CSI-RS may be cell-specific so as to be distinguished for each cell included in a base station that transmits the CSI-RS, and may need to be sufficiently scattered in a frequency and a time for a low overhead.

Referring again to FIG. 2, the user equipment 110 stores a first codebook 112 that expresses N first precoding matrices used for a first precoder and first indices indexing the first precoding matrices and a second codebook 114 that expresses M second precoding matrices used for a second precoder and second indices indexing the second precoding matrices. The first codebook 112 and the second codebook 114 may be identical to the first codebook 122 and the second codebook 124 stored in the base station 120, respectively.

The user equipment 110 stores a restriction book 116, which will be described with reference to Table 4, including ranks and a plurality of indices (hereinafter referred to as a restriction index) corresponding to each pair of a first index and a second index included in each rank. The restriction book 116 stored in each user equipment 110 may be identical to the restriction book 126 stored in the base station 120.

The user equipment 110 may receive codebook restricting information 128 from the base station 120. The codebook restricting information 128 includes at least one of first information that restricts a precoding matrix from being used as a first precoding matrix and second information that restricts a precoding matrix from being used as a second precoding matrix in first and second codebooks for each layer.

The user equipment 110 determines, based on the first information included in the codebook restricting information 128, a first precoding matrix excluding precoding matrices that are restricted from being used as a first precoding matrix, and reports/feeds back $1^{st}$ channel status information 132 associated with the determined precoding matrix to the base station 120. Also, each user equipment 110 determines, based on the second information included in the codebook restricting information 128, a second precoding matrix excluding precoding matrices that are restricted from being used as a second precoding matrix, and reports/feeds back $2^{nd}$ channel status information 134 associated with the determined second precoding matrix to the base station 120.

The base station 120 determines precoding matrices of the first precoder and the second precoder from the first codebook 122 and the second codebook 124 based on the channel status information 132 and 134 reported from each user equipment 110, and performs precoding of data symbols using the precoding matrices.

Referring again to FIG. 3, the base station 120 transmits a precoded signal 136 to the user equipment 110 as illustrated in FIG. 3. Conversely, the user equipment 110 receives the signal 136 and decodes the signal into original data.

The process has been described in which a base station and a user equipment exchange codebook restricting information and channel status information in the wireless communication system when a multistage precoder is used in a case of codebook restriction. Hereinafter, a MIMO wireless communication system that transmits and receives codebook restricting information and the channel station information will be described.

Figure 4:
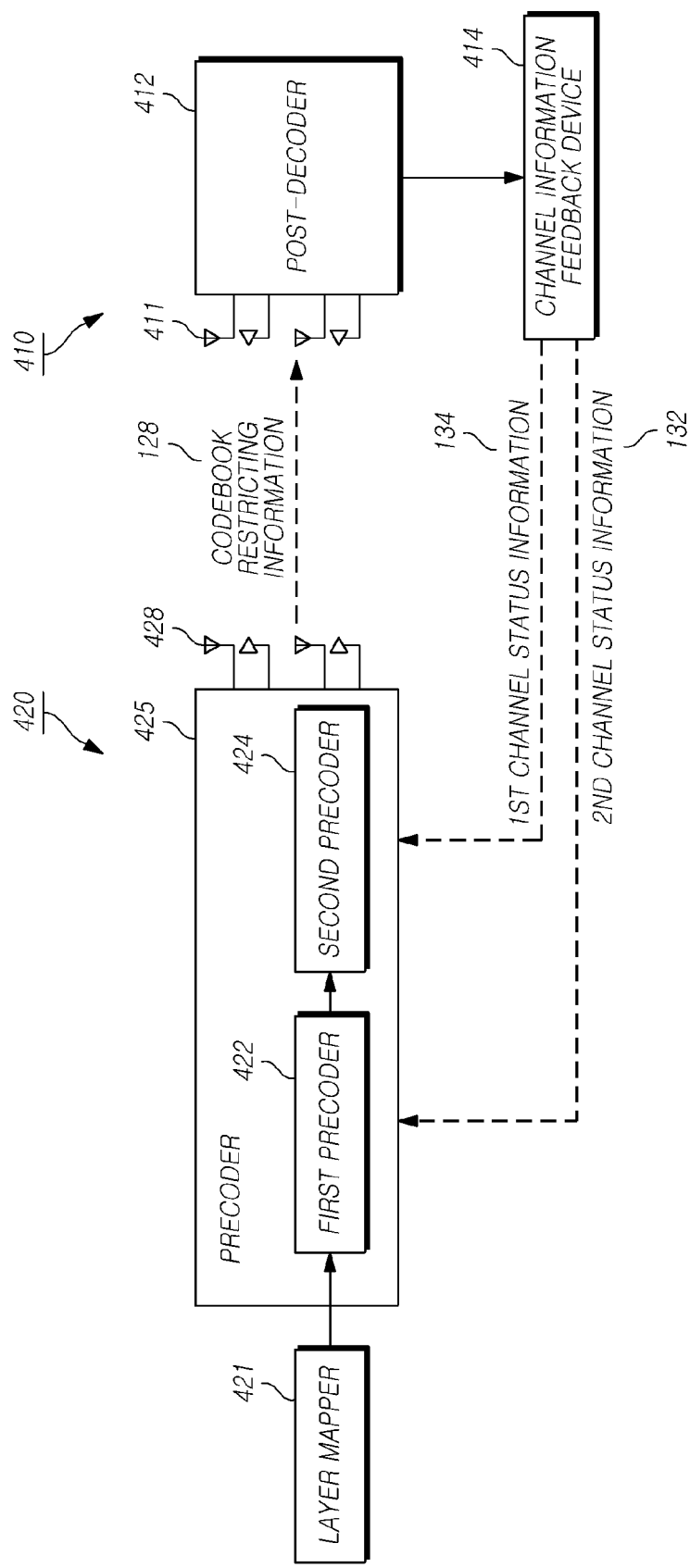
FIG. 4 is a block diagram illustrating a base station and a user equipment in a MIMO wireless communication system according to an embodiment of the present invention.
Figure 5:
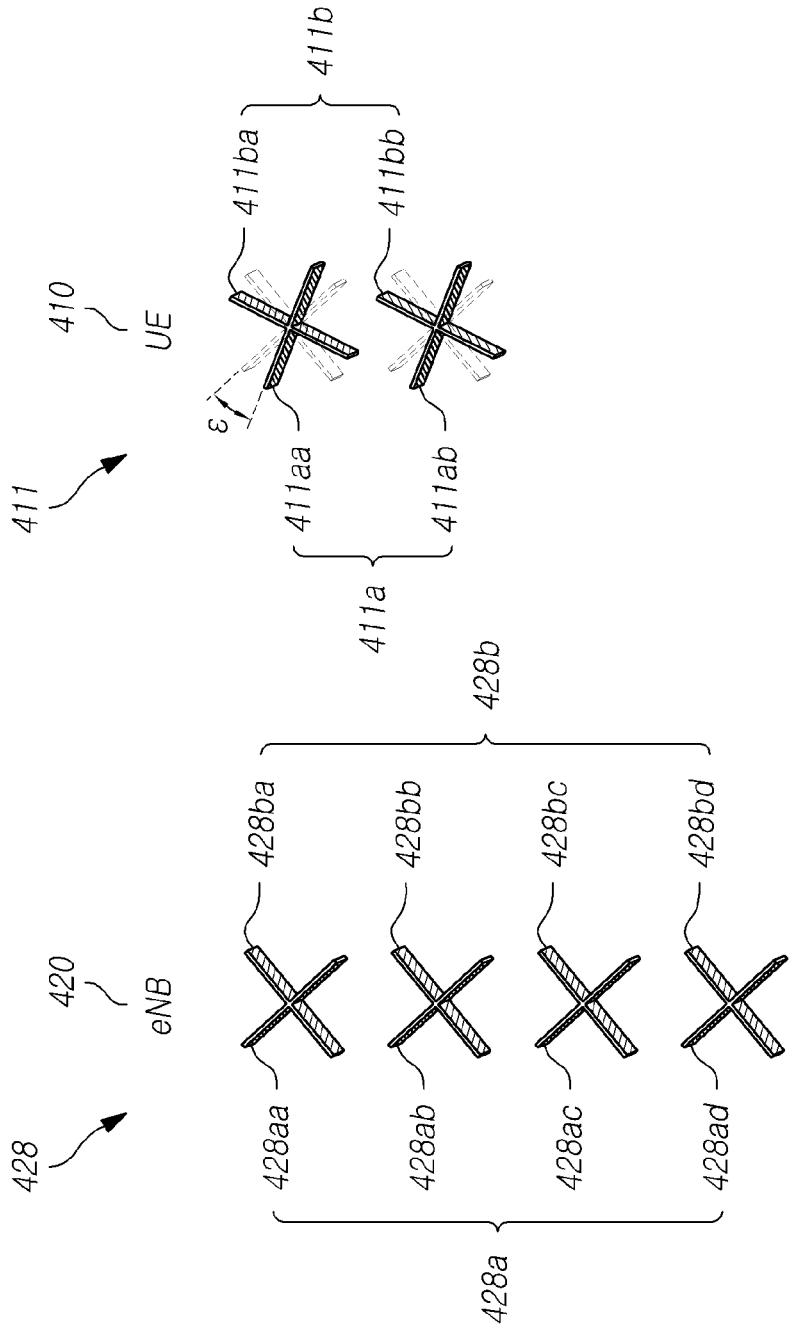
FIG. 5 is a diagram illustrating a channel between a base station and a user equipment that use a polarized antenna array of FIG. 4.

FIG. 4 is a block diagram illustrating a base station and a user equipment in a MIMO wireless communication system according to an embodiment of the present invention. FIG. 5 illustrates a channel between a base station and a user equipment that uses a polarized antenna array of FIG. 4.

Referring to FIG. 4, a MIMO wireless communication system may include a user equipment 410 and a base station 420.

The user equipment 410 includes an antenna array 411 to receive a signal through a downlink channel, a post-decoder 412 to process a received signal and to decode the received signal into original data using a precoding matrix, and a channel information feedback device 414.

The antenna array 411 may use a plurality of antennas. In this example, the antenna array 411 may form a polarized antenna array. The array may be embodied as a dual polarized antenna array in which two antennas having different polarities intersect each other so as to arrange a larger number of antennas in a limited space.

Referring to FIG. 5, when "+" indicates a direction polarizing to the right from the vertical direction and "−" indicates a direction polarizing to the left from the vertical direction, the user equipment 410 includes a polarized antenna array 411 including two pairs of antennas in which antennas 411aa and 411ab polarized at 45 degrees from the vertical direction and 411ba and 411bb polarized at −45 degrees from the vertical direction intersect to each other, respectively. In this example, the antennas 411aa and 411ab polarized at +45 degrees may be referred to as a first domain 411a or a first subset of a transmitting side, and the antennas 411ba and 411bb polarized at −45 degrees may be referred to as a second domain 411b or a second subset of the transmitting side.

Referring again to FIG. 4, the post-decoder 412 may correspond to a first precoder 422 and a second precoder 424 of the base station 420. The post-decoder may transfer a received reference signal to the channel information feedback device 414.

The channel information feedback device 414 may receive a reference signal and may estimate a channel using the reference signal. The channel information feedback device 414 may generate channel information including $1^{st}$ channel status information and $2^{nd}$ channel station information. The channel information feedback device 414 may feed back the channel information to the base station 420.

The base station 420 may include a layer mapper 421 to map a codeword to a layer, a precoder 425 to perform precoding of data symbols obtained through the layer mapping using a precoding matrix, and an antenna array 428 to transmit a precoded signal on air. The precoder 425 may include the first precoder 422 and the second precoder 424 to perform precoding of data symbols. In this example, the first precoder 422 and the second precoder 424 may perform precoding of data symbols using a corresponding first precoding matrix and a corresponding second precoding matrix, respectively.

The antenna array 428 of the base station 420 may use a plurality of antennas. In this example, the antenna array 428 may form a polarized antenna array. An array may be embodied as a dual polarized antenna array in which two antennas having different polarities intersect each other so as to arrange a larger number of antennas in a limited space in a wireless communication system. In this example, although it is described that the antenna arrays 411 and 428 use a dual polarized antenna array, this may not be limited thereto.

Referring to FIG. 5, the base station 420 includes a polarized antenna array 428 including four pairs of antennas in which antennas 428aa through 428ad polarized at 45 degrees from the vertical direction and antennas 428ba through 428bd polarized at −45 degrees intersect each other, respectively. In this example, the antennas 428aa through 428ad polarized at +45 degrees are referred to as a first domain 428a or a first subset of a receiving side, and the antennas 428ba through 428bd polarized at −45 degrees are referred to as a second domain 428b or a second subset of a receiving side.

When a phase mismatch does not exist between polarized antennas of the user equipment 410 and the base station 420, an overall channel H may be expressed as shown in Equation 1.

$$H = \begin{bmatrix} H_h & 0 \\ 0 & H_v \end{bmatrix} \qquad \text{Equation 1}$$

In this example, $H_h$ denotes a channel between the first subset or the first domain 411a of the user equipment 410 and the first subset or the first domain 428a of the base station 420, and $H_v$ denotes a channel between the second subset or the second domain 411b and the second subset or the second domain 428b of the base station 420.

As shown in Equation 1, when antennas polarized to different directions intersect each other and have no phase mismatch, the antennas may not affect each other. Therefore, only $H_h$ and $H_v$ may be estimated and thus, a channel may be recognized. When a distance d between adjacent polarized antennas is shorter than a signal wavelength λ, a correlation between antennas may be high. In this example, $H_h$ and $H_v$ may be determined based on a distance d between antennas and an incident angle θ of signal propagation that arrives at the user equipment 410.

When a phase mismatch exists between polarized antennas of the user equipment 410 and the base station 420, for example, when pairs of antennas of the user equipment 410 are tilted to the left by ε, signals transmitted from each polarized domain of the base station 420 may be received by two polarized domains of the user equipment 410 and thus, inter-domain interference may occur due to a phase mismatch between the domains. Therefore, a channel may be affected by a degree of a phase error or a phase mismatch between polarized antennas of the user equipment 410 and the base station 420, that is, by ε, and thus, the overall channel H may be expressed by Equation 2.

$$H = \begin{bmatrix} H_h \cos\varepsilon & -H_v \sin\varepsilon \\ H_h \sin\varepsilon & H_v \cos\varepsilon \end{bmatrix} \quad \text{Equation 2}$$

Referring again to FIG. 4, the second precoder 424 may correct a phase mismatch to remove an effect from a phase error or a phase mismatch between polarized domains formed by the antenna array 428 including antennas intersecting in a horizontal direction and a vertical direction, and the first precoder may perform intra-domain precoding.

When a dual polarized domain is configured based on a scheme of arranging two antennas at the same location, each polarized domain may have an identical spatial channel characteristic. That is, each domain may be precoded based on an identical precoding matrix ($H_h = H_v = R_0$), and a signal transmitted through each polarized domain may have a different phase and size when arriving at the user equipment 410. In this example, a first precoding matrix and a second precoding matrix used in the first precoder 422 and the second precoder 424 may be expressed by Equation 3.

$$W = \underbrace{\begin{pmatrix} R_0 & 0 \\ 0 & R_0 \end{pmatrix}}_{W_1} \underbrace{\begin{pmatrix} I \\ \Lambda \end{pmatrix}}_{W_2} \quad \text{Equation 4}$$

In Equation 3, $R_0$ denotes a value determined by a precoding gain when the first is domain and the second domain have an identical spatial channel status, I denotes a unit matrix, and Λ denotes a phase mismatch correction value between the first domain and the second domain.

A size of a signal received in each domain may be determined by a precoding gain of $R_0$ of a first precoding matrix $W_1$, a second precoding matrix $W_2$ corrects a phase mismatch between signals received in respective domains. When an operation proceeds in this manner, a first index $PMI_1$ for setting the first precoding matrix $W_1$ and a second index $PMI_2$ for setting the second precoding matrix $W_2$ may be independently selected.

As shown in Equation 3, the precoder 425 is a precoder configured of a first precoding matrix that performs precoding using $R_0$ determined by a precoding gain in each of the two domains (a polarized domain or a subset of antennas) and a second precoding matrix that performs phase mismatch correction (co-phasing) between domains. Therefore, each of the two independent domains may be precoded by $R_0$ determined by a precoding gain, and one of the domains may be phase-corrected by Λ and may be transmitted.

In the precoder 425, the second precoding matrix corresponds to a precoding matrix that corrects signal attenuation caused by a phase error between polarized domains in polarized antennas. Also, the second precoding matrix may correspond to a precoding matrix to correct signal attenuation caused by a phase error between polarized domains, or may correspond to a precoding matrix to correct a phase mismatch that naturally occurs between polarized antennas. The base station 420 stores a first codebook that expresses N (N is a natural number greater than or equal to 1) first precoding matrices used for the first precoder 422 and first indices indexing the first precoding matrices, and a second codebook that expresses M (M is a natural number greater than or equal to 1) second precoding matrices and second indices indexing the second precoding matrices.

Table 2 and Table 3 correspond to examples of the first codebook and the second codebook that use 16 precoding matrices and 4 precoding matrices for each rank, respectively, when the antenna array 428, including 8 dual polarized antennas 428a and 428b, simultaneously transmits a total of 8 layers.

TABLE 2

| | $PMI_1$ | | | | |
|---|---|---|---|---|---|
| RI | 0 | 1 | 2 | ... | 15 |
| 1 | b0 | b1 | b2 | ... | b15 |
| 2 | b16 | b17 | b18 | ... | b31 |
| ... | ... | ... | ... | ... | ... |
| 8 | b112 | b113 | b114 | ... | b127 |

TABLE 3

| | $PMI_2$ | | | |
|---|---|---|---|---|
| RI | 0 | 1 | 2 | 3 |
| 1 | c0 | c1 | c2 | c3 |
| 2 | c4 | c5 | c6 | c7 |
| ... | ... | ... | ... | ... |
| 8 | c28 | c29 | c30 | c31 |

The base station 420 stores a restriction book including ranks and an index (hereinafter referred to as a restriction index) corresponding to each pair of a first index and a second index for each rank. Table 4 corresponds to a restriction book that uses 16 precoding matrices and 4 precoding matrices for each rank when the antenna array 428, including 8 dual polarized antennas 428a and 428b, simultaneously transmits a total of 8 layers.

TABLE 4

| RI | (0,0) | (0,1) | (0,2) | (0,3) | (1,0) | (1,1) | ... | (15,1) | (15,2) | (15,3) |
|---|---|---|---|---|---|---|---|---|---|---|
| 1 | a0 | a1 | a2 | a3 | a4 | a5 | ... | a61 | a62 | a63 |
| 2 | a64 | a65 | a66 | a67 | a68 | a69 | ... | a125 | a126 | a127 |
| ... | ... | ... | ... | ... | ... | ... | ... | ... | ... | ... |
| 8 | a448 | a449 | a450 | a451 | a452 | a453 | ... | a509 | a510 | a511 |

In a case of codebook restriction, when codebook restricting information is transmitted based on a bitmap format that designates whether each precoding matrix is to be used using one bit, a total of 16×4×8=512 bits may be required for the ranks and pairs of a first index and a second index for respective ranks.

However, as described in the foregoing, a first index $PMI_1$ for setting a first precoding matrix $W_1$ and a second index $PMI_2$ for setting a second precoding matrix $W_2$ may be independently selected and thus, a codebook may be restricted independently with respect to each precoding matrix, for each rank and for each of the first precoder and the second precoder. Table 5 expresses precoders that are restricted in a restriction book when codebook restriction is determined with respect to the first index=0 ($PMI_1$=0) and the second index=1 ($PMI_2$=1) in a rank 1.

TABLE 6

| RI | (0,0) | (0,1) | (0,2) | (0,3) | (1,0) | (1,1) | ... | (15,1) | (15,2) | (15,3) |
|---|---|---|---|---|---|---|---|---|---|---|
| 1 | a0 | a1 | a2 | a3 | a4 | a5 | ... | a61 | a62 | a63 |
| 2 | a64 | a65 | a66 | a67 | a68 | a69 | ... | a125 | a126 | a127 |
| ... | ... | ... | ... | ... | ... | ... | ... | ... | ... | ... |
| 8 | a448 | a449 | a450 | a451 | a452 | a453 | ... | a509 | a510 | a511 |

Although not illustrated in Table 5, a codebook restriction may be independently performed on a first precoding matrix and a second precoding matrix with respect to 8 ranks, in the same manner as the codebook restriction performed on the rank 1.

The base station 420 determines a precoding matrix to be used/not used for each cell or for each user equipment, and transmits codebook restricting information associated with the precoding matrix to be not used to the user equipment 410. In this example, the codebook restricting information may include first information that restricts a precoding matrix from being used as a first precoding and second information that restricts a precoding matrix from being used as a second precoding matrix in the first and second codebooks for each layer.

As shown in Table 5, when codebook restriction on a first index=0 ($PMI_1$=0) and a second index=1 ($PMI_2$=1) is determined with respect to the rank 1, codebook restricting information may include [0111111111111111] corresponding to first information and corresponding to second information in a bitmap format. As described in the foregoing, a corresponding order of an available precoding matrix is expressed to be 1, and a corresponding order of a precoding matrix not to be used is expressed to be 0. Accordingly, a codebook may be generally restricted with respect to second indices that make pairs with the first index=0 ($PMI_1$=0), for example, ($PMI_1$, $PMI_2$)=(0,1), (0,1), (0, 2), (0,3) in Table 5. Also, a codebook may be generally restricted with respect to the first indices that make pairs with the second index=1 ($PMI_2$=1), for example, ($PMI_1$, $PMI_2$)=(0,1), (1,1), . . . , (14,1), (15,1) in table 5.

When a codebook restriction on a first index=1 ($PMI_1$=1) and a second index=2 ($PMI_2$=2) is determined with respect to a rank 2, codebook restricting information may include [1011111111111111] corresponding to first information and [1101] corresponding to second information. Accordingly, a codebook may be generally restricted with respect to second indices that make pairs with the first index=1 ($PMI_1$=1), for example, ($PMI_1$, $PMI_2$)=(1,1), (1,1), (1,2), (1,3) in Table 5. Also, a codebook may be generally restricted with respect to the first indices that make pairs with the second index=2 ($PMI_2$=2), for example, ($PMI_1$, $PMI_2$)=(0,2), (1,2), . . . , (14,2), (15,2) in table 5.

When a codebook restriction on a first index=0 ($PMI_1$=0) and a second index=3 ($PMI_2$=3) is determined with respect to a rank 8, codebook restricting information may include [0111111111111111] corresponding to first information and [1110] corresponding to second information. Accordingly, a codebook may be generally restricted with respect to second indices that make pairs with the first index=0 ($PMI_1$=0), for example, ($PMI_1$, $PMI_2$)=(0,1), (0,1), (0, 2), (0,3) in Table 5. Also, a codebook may be generally restricted with respect to the first indices that make pairs with the second index=3 ($PMI_2$=3), for example, ($PMI_1$, $PMI_2$)=(0,3), (1,3), . . . , (14,3), (15,3) in table 5.

In other words, the codebook restricting information includes the first information and the second information. Accordingly, when a first precoding matrix is restricted from being used as a first precoding matrix based on the first information, the use of second precoding matrices that make pairs with the restricted first precoding matrix may be restricted. When a second precoding matrix is restricted from being used as a second precoding matrix based on the second information, the use of first precoding matrices that make pairs with the restricted second precoding matrix may be restricted.

In the same manner, codebook restricting information with respect to each of a rank 3 through a rank 7 may include first information and second information in a bitmap format. In this example, although the codebook restricting information including the first information and the second information is provided in a bitmap format, this is merely an example and may not be limited thereto.

In the same manner described in the foregoing, when the rank 1 through rank 8 transmit codebook restricting information based on the same bitmap format, a total number of bits of the codebook restricting information that independently restricts a first precoding matrix and a second precoding matrix with respect to a total of 8 ranks may be (16+4)×8=160.

The base station 420 may transmit, to the user equipment 410, codebook restricting information that expresses codebook restriction based on a bitmap format using 20 bits for each rank, that is, a total of 160 bits for the rank 1 through the rank 8. The codebook restricting information may be transmitted as downlink control information, for example, an RRC signal, from the base station 420 to the user equipment 410 through a Physical Downlink Shared Channel (PDSCH). In this example, the codebook restricting information may be transmitted from the base station 420 to the user equipment 410 through a Physical Downlink Control Channel (PDCCH) in addition to the PDSCH. In this example, the codebook restricting information may sequentially include first information and second information for each rank. For example, the codebook restricting information may include first information and second information associated with the rank 1, first information and second information associated with the rank 2, . . . , and first information and second information associated with the rank 8, sequentially.

The codebook restricting information may sequentially include first information for each rank, and then may sequentially include second information for each rank. For example, the codebook restricting information may sequentially include first information associated with the rank 1 through the rank 8, and then may sequentially include second information associated with the rank 1 through the rank 8. The first information and the second information included in the codebook restricting information may be independently transmitted for each rank from the base station 420 to the user equipment 410. When a codebook is not restricted for a predetermined rank, codebook restricting information associated with the predetermined codebook may not be included.

Accordingly, when a pair of a first index and a second index is restricted, codebook restricting information of a total of 512 bits is required. However, when restriction on a first index and a second index is independently determined and transmitted, an amount of feedback overhead of the codebook restriction may be significantly reduced.

When the first precoder 422 performs intra-domain precoding using a first precoding matrix, for example, in a case where a codebook is restricted so that precoding matrices expressed to be a first index=7 ($PMI_1$=7) are not to be used since an intra-domain precoding gain is small, any precoding matrix that is expressed to be $PMI_1$=7 when the second precoder 424 performs phase mismatch correction using a second precoding matrix may not obtain an excellent precoding gain.

That is, determining restriction on a first precoding matrix that performs intra-domain precoding may take precedence over determining restriction on a second precoding matrix that performs phase mismatch correction. Therefore, when a codebook restriction is performed, only the first precoding matrix may be restricted. In this example, the codebook restricting information includes only first information that restricts the first precoding matrix and thus, a total of 16×8=128 bits may be required.

When inter-domain phase mismatch interference takes precedence in a condition of the same inter-domain interference, only the second precoding matrix may be restricted. In this example, the codebook restricting information includes only second information that restricts the second precoding matrix and thus, a total of 4×8=32 bits may be required.

As described in the foregoing, a scheme that restricts both the first precoding matrix and the second precoding matrix, independently, a scheme that restricts only the first precoding matrix, and a scheme that restricts only the second precoding matrix may be selectively used. In this example, the base station 420 may transmit, to the user equipment 410, a restriction mode indicator of a total of 2 bits that indicates a restriction mode.

The channel information feedback device 414 of the user equipment 410 determines a first precoding matrix excluding precoding matrices that are restricted from being used as a first precoding matrix based on first information included in codebook restricting information, and reports/feeds back, to the base station 420, $1^{st}$ channel status information associated with the first precoding matrix. In the example provided in the foregoing, when [0111111111111111] corresponding to first information of a bitmap format that restricts a codebook with respect to a first index=0 ($PMI_1$=0) in a rank 1 is received, the channel information feedback device 414 determines a first precoding matrix from among precoding matrices corresponding to indices excluding the first index=0 ($PMI_1$=0), that is, from among precoding matrices excluding precoding matrices corresponding the first index=0, and reports/feeds back $1^{st}$ channel status information associated with the first precoding matrix to the base station. Also, each user equipment 410 determines a second precoding matrix excluding matrices that are restricted from being used as a second precoding matrix based on second information included in codebook restricting information, and reports/feeds back, to the base station 420, $2^{nd}$ channel status information associated with the second precoding matrix. In the example provided in the foregoing, when [1011] corresponding to second information of a bitmap format that restricts a codebook with respect to a second index=1 ($PMI_2$=1) in a rank 2 is received, the channel information feedback device 414 determines a second precoding matrix from among precoding matrices corresponding to indices excluding the second index=1 ($PMI_2$=1), that is, from among precoding matrices excluding precoding matrices corresponding to the second index=1, and reports/feeds back $2^{nd}$ channel status information associated with the second precoding matrix to the base station.

When [1011111111111111] corresponding to first information and [1101] corresponding to second information of a bitmap format that restrict a codebook with respect to a first index=1 ($PMI_1$=1) and a second index=2 ($PMI_2$=2) in the rank 2 are received, the channel information feedback device 414 determines a first precoding matrix and a second precoding matrix excluding precoding matrices corresponding to the first index=1 ($PMI_1$=1) and the second index=2 ($PMI_2$=2) with respect to the rank 2 as shown in Table 5, and reports/feeds back, to the base station, the associated $1^{st}$ channel status information and $2^{nd}$ channel status information. In the same manner, the channel information feedback device 414 may determine a first precoding matrix and a second precoding matrix excluding precoding matrices designated by first information and second information, with respect to the rank 3 through the rank 8.

As described in the foregoing, a scheme that restricts both the first precoding matrix and the second precoding matrix, independently, a scheme that restricts only the first precoding matrix, and a scheme that restricts only the second precoding matrix may be selectively used. When the base station 420 transmits, to the user equipment 410, a restriction mode indicator of a total of 2 bits that indicates a restriction mode, the channel information feedback device 414 of the user equipment 410 may determine a first precoding matrix and a second precoding matrix based on the restriction mode, and generates and reports $1^{st}$ channel status information and $2^{nd}$ channel status information.

A feedback period or interval of the $1^{st}$ channel status information and the $2^{nd}$ channel status information may be different from each other. For example, the $1^{st}$ channel status information may be fed back to the base station 420 based on a short term, and the $2^{nd}$ channel status information may be fed back to the base station 420 based on a long term. In other words, a long period/long term and a short period/short term are relative terms, and the long period/long term indicates a period that is longer than the short period/short term.

The first precoder 422 and the second precoder 424 of the base station 420 determine first and second precoding matrices based on/using channel status information reported from each user equipment 410, and perform precoding of data symbols using the precoding matrices.

The MIMO wireless communication system that transmits and receives codebook restricting information and channel status information according to another embodiment of the present invention has been described. Hereinafter, a communication method of a transmitting device according to another embodiment of the present invention will be described.

Figure 6:
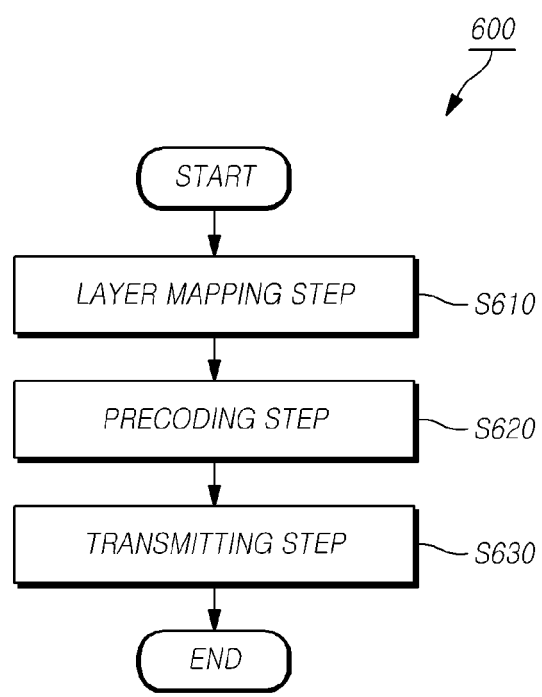
FIG. 6 is a flowchart illustrating a communication method of a transmitting device according to another embodiment of the present invention.

FIG. 6 is a flowchart illustrating a communication method of a transmitting device according to another embodiment of the present invention.

Referring to FIG. 6, a communication method 600 of a transmitting device according to another embodiment of the present invention includes a layer mapping step S610 to map a codeword to a layer, a precoding step S620 to perform precoding of symbols, and a transmitting step S630 to propagate a precoded symbol into air through two or more antennas. The layer mapping step S610, the precoding step S620, and the transmitting step S630 are identical as described in the foregoing and thus, detailed descriptions thereof will be omitted.

A communication method 600 of a base station according to another embodiment of the present invention independently performs codebook restriction on a first precoding matrix of Table 3 and a second precoding matrix of Table 4 with respect to each rank by referring to Table 5, and transmits, to the user equipment 410, codebook restricting information that expresses codebook restriction in a bitmap format using 20 bits for each rank, that is, a total of 160 bits from a rank 1 through a rank 8. The codebook restricting information may be transmitted as downlink control information, for example, an RRC signal, from the base station 420 to the user equipment 410 through a Physical Downlink Shared Channel (PDSCH). In this example, the codebook restricting information may be transmitted from the base station 420 to the user equipment 410 through another channel such as a Physical Downlink Control Channel (PDCCH) in addition to the PDSCH.

In the layer mapping step S610, the codebook restricting information may be mapped to a layer as a downlink control signal.

The base station 420 determines a precoding matrix to be used/not to be used for each cell or each user equipment, and transmits codebook restricting information associated with the precoding matrix to the user equipment 410. In this example, the codebook restricting information includes first information to restrict a precoding matrix from being used as a first precoding matrix and second information to restrict a precoding matrix from being used as a second precoding matrix in first and second codebooks for each layer.

As shown in Table 5, when codebook restriction is determined with respect to a first index=0 ($PMI_1$=0) and a second index=1 ($PMI_2$=1) in a rank 1, codebook restricting information may include [01111111111111111] corresponding to first information and [1011] corresponding to second information in a bitmap format.

The precoding step S620 may perform precoding of a data symbol obtained through layer mapping, using a first precoding matrix and a second precoding matrix selected from a corresponding codebook. In this example, the precoding step S620 may perform precoding of data symbols using a first precoding matrix and a second precoding matrix corresponding to a first index and a second index received from a receiving device such as a user equipment. In this example, the first index and the second index received from the receiving device may correspond to indices associated with precoding matrices selected from precoding matrices excluding precoding matrices that are restricted based on the codebook restricting information in the first codebook of Table 3 and the second codebook of Table 4.

As described in the foregoing, the transmitting device such as a base station may include at least one antenna pair in which at least one antenna polarized in one direction and at least one antenna polarized in another direction intersect each other.

In this example, as described with reference to Equation 3, a first precoding matrix performs precoding between one antenna and another antenna that intersect each other, and a second precoding matrix performs phase mismatch correction between one antenna and another antenna.

The communication method of the transmitting device has been described. Hereinafter, a communication method of a receiving device will be described.

Figure 7:
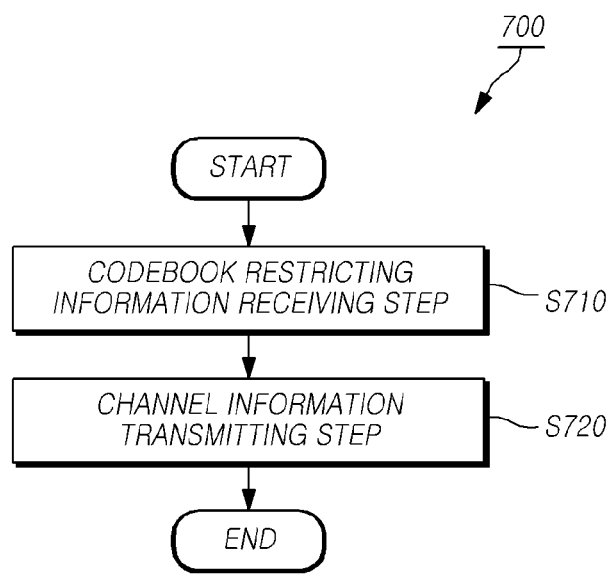
FIG. 7 is a flowchart illustrating a communication method of a receiving device according to another embodiment of the present invention.

FIG. 7 is a flowchart illustrating a communication method of a receiving device according to another embodiment of the present invention.

A communication method 700 of a receiving device may include a codebook restricting information receiving step S710 to receive codebook restricting information from a transmitting device, and a channel information transmitting step S720 to transmit $1^{st}$ channel status information and $2^{nd}$ channel status information to the transmitting device.

The codebook restricting information receiving step S710 may receive first information to restrict a precoding matrix from being used as a first precoding matrix and second information to restrict a precoding matrix from being used as a second precoding matrix for each layer. In this example, the codebook restricting information includes first information to restrict a precoding matrix from being used as a first precoding matrix and second information to restrict a precoding matrix from being used as a second precoding matrix in a first codebook and a second codebook for each layer. The channel information transmitting step S720 transmits, to the transmitting device, $1^{st}$ channel status information indicating a first precoding matrix and $2^{nd}$ channel status information indicating a second precoding matrix, the first precoding matrix and the second precoding matrix being selected, based on codebook restricting information, from precoding matrices that are not restricted from being used as a first precoding matrix or a second precoding matrix in a codebook.

Step S710 and step S720 will be described in detail in the following. When the receiving device receives [01111111111111111] corresponding to first information and [1011] corresponding to second information in a bitmap format that restrict a codebook with respect to a first index=0 ($PMI_1$=0) in a rank 1 in step S710, the receiving device determines a first precoding matrix from among precoding matrices corresponding to indices excluding the first index=0 ($PMI_1$=0), that is, from among precoding matrices excluding precoding matrices corresponding to the first index=0, as shown in Table 5, and reports/feeds back associated $1^{st}$ channel status information to a base station, and determines a second precoding matrix from among precoding matrices corresponding to indices excluding the second index=1 ($PMI_2$=1), that is, from among precoding matrices excluding precoding matrices corresponding to the second index=1, and reports/feeds back associated $2^{nd}$ channel status information to the base station in step S720.

Accordingly, a codebook may be generally restricted with respect to second indices that make pairs with the first index=0 ($PMI_1=0$), for example, ($PMI_1$, $PMI_2$)=(0,1), (0,1), (0, 2), (0,3) in Table 5. Also, a codebook may be generally restricted with respect to the first indices that make pairs with the second index=1 ($PMI_2=1$), for example, ($PMI_1$, $PMI_2$)= (0,1), (1,1), . . . , (14,1), (15,1) in table 5.

When the receiving device receives [1011111111111111] corresponding to first information and [1101] corresponding to second information of a bitmap format that restrict a codebook with respect to a first index=1 ($PMI_1=1$) and a second index=2 ($PMI_2=2$) in a rank 2 in step S710, the receiving device determines a first precoding matrix and a second precoding matrix excluding precoding matrices corresponding to the first index=1 ($PMI_1=1$) and the second index=2 ($PMI_2=2$) for the rank 2 as shown in Table 5, and reports/feeds back is associated $1^{st}$ channel status information and associated $2^{nd}$ channel status information to the base station in step S720.

Accordingly, a codebook may be generally restricted with respect to second indices that make pairs with the first index=1 ($PMI_1=1$), for example, ($PMI_1$, $PMI_2$)=(1,1), (1,1), (1, 2), (1,3) in Table 5. Also, a codebook may be generally restricted with respect to the first indices that make pairs with the second index=2 ($PMI_2=2$), for example, ($PMI_1$, $PMI_2$)= (0,2), (1,2), . . . , (14,2), (15,2) in table 5.

In other words, the codebook restricting information includes the first information and the second information. Accordingly, when a first precoding matrix is restricted from being used as a first precoding matrix based on the first information, the use of second precoding matrices that make pairs with the restricted first precoding matrix may be restricted. When a second precoding matrix is restricted from being used as a second precoding matrix based on the second information, the use of first precoding matrices that make pairs with the restricted second precoding matrix may be restricted.

In the same manner, the receiving device may determine a first precoding matrix and a second precoding matrix for each of a rank 3 through a rank 8, excluding precoding matrices designated by first information and second information.

The process in which a base station and a user equipment exchange codebook restricting information and channel status information in a wireless communication system when a codebook is restricted in a case where a multistage precoder is used, a MIMO wireless communication system that transmits and receives codebook restricting information and channel status information, and the transceiving method or communication method of the transmitting device and the receiving device in the wireless communication system have been described.

According to the embodiments of the present invention, information to restrict precoding matrices is determined for each multistage precoder, and codebook restricting information including the determined information is transmitted and thus, an amount of transmission overhead of the codebook restricting information may be reduced. According to the embodiments of the present invention, the wireless communication system uses the codebook restriction scheme and thus, inter-cell interference may be controlled.

According to a definition of a precoding matrix as described with reference to Equation 3, a precoding gain in each domain or a subset of an antenna is determined by a first precoding matrix. That is, an overall precoding gain is determined by a gain associated with the first precoding matrix and a coding gain of a second precoder matrix that performs phase mismatch correction (co-phasing) between domains or subsets. In this example, the second precoding matrix performs phase mismatch correction (co-phasing) between domains or subsets and thus, a maximum precoding gain that each user equipment is able to obtain may be determined by the first precoding matrix. In other words, power or receivable maximum power of a signal that each user equipment receives is determined by a first precoder or a first precoding matrix, and a second precoder or a second precoding matrix performs only phase correction of a signal received by each domain or subset of an antenna. Interference by multiple-access may be significantly affected by a first precoder or a first precoding matrix.

Figure 8:
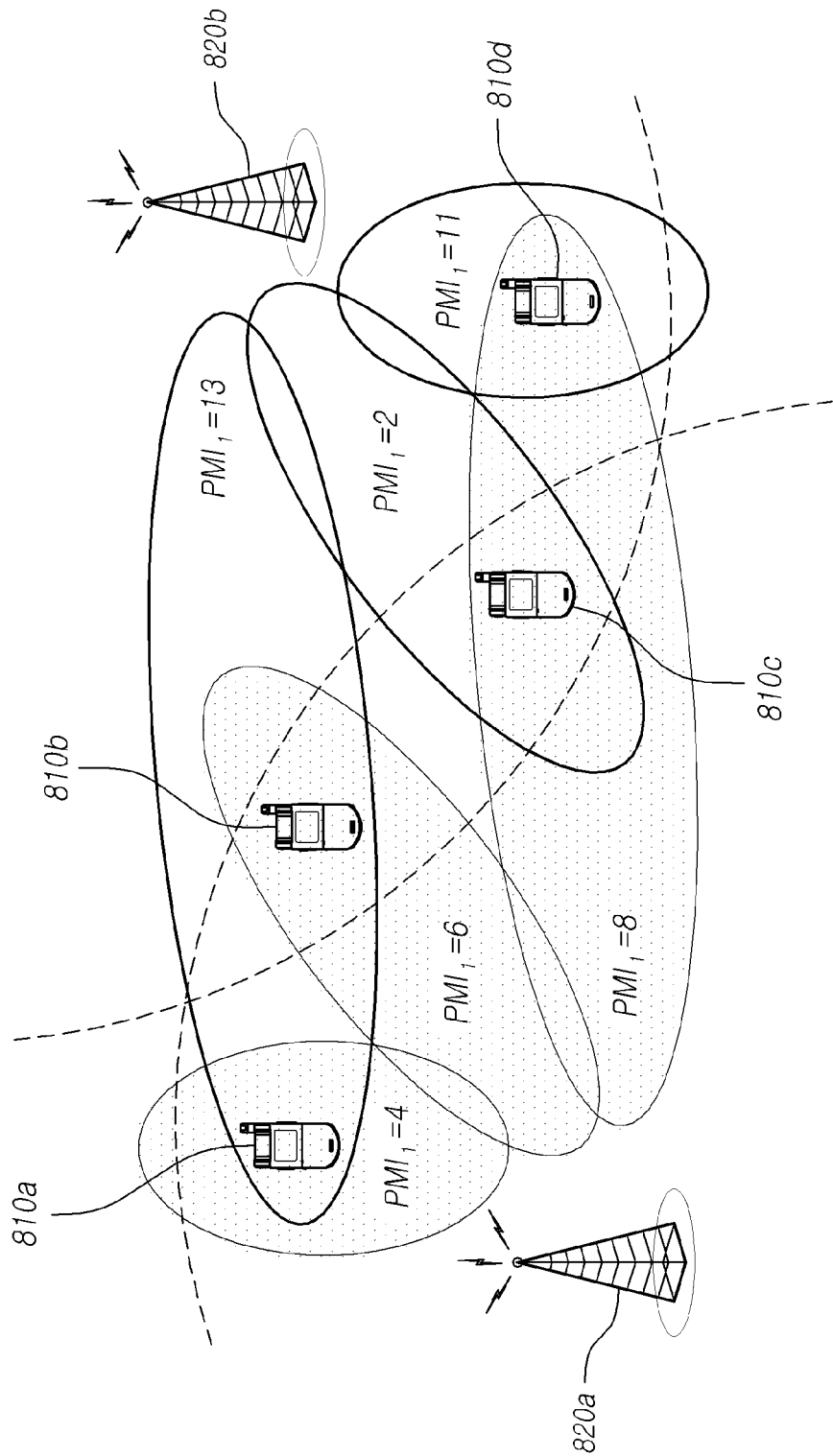
FIGS. 8 through 10 are conceptual diagrams illustrating a process of controlling inter-cell interference using a codebook restriction scheme in a wireless communication system according to embodiments of the present invention.
Figure 9:
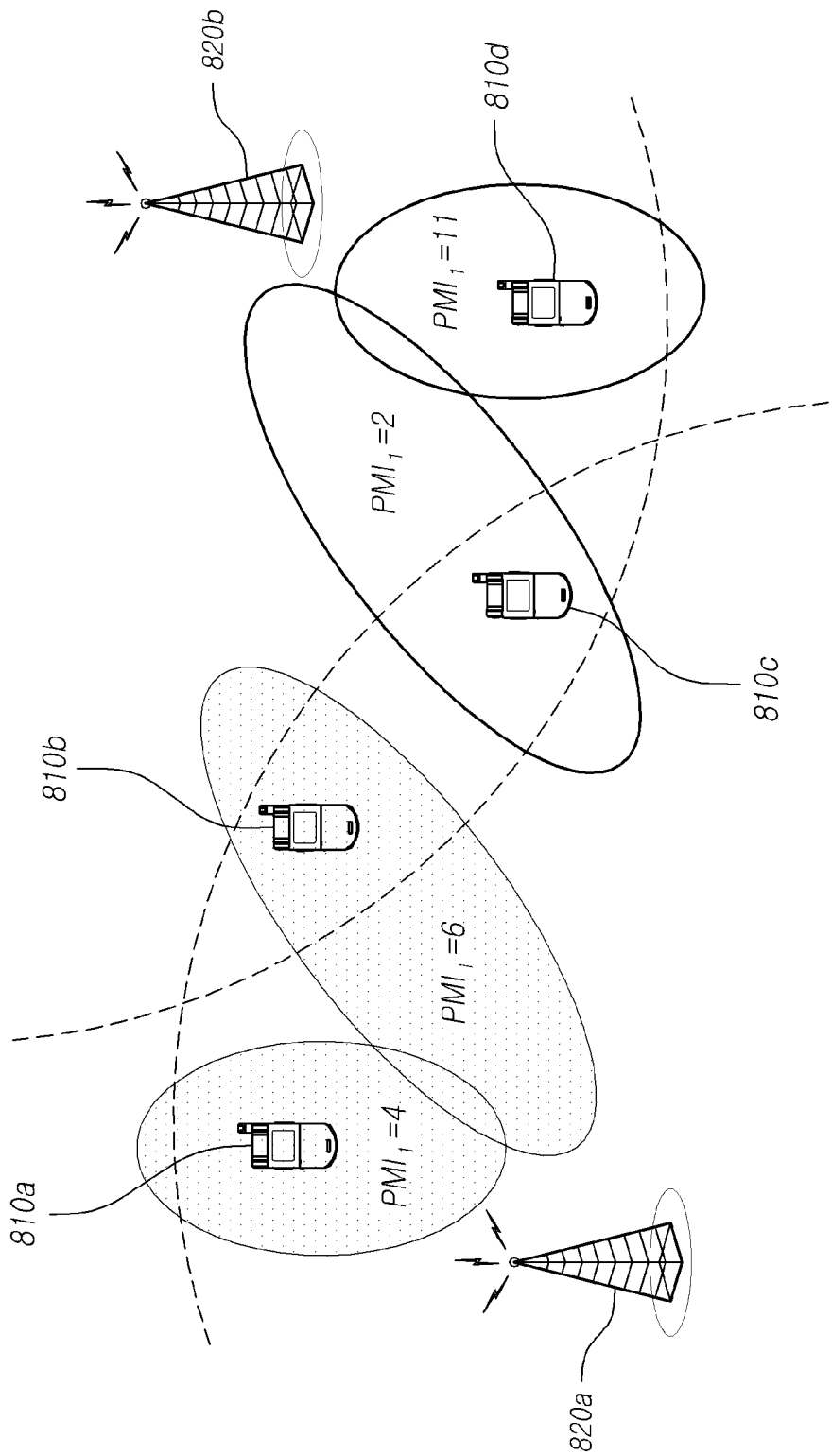
Figure 10:
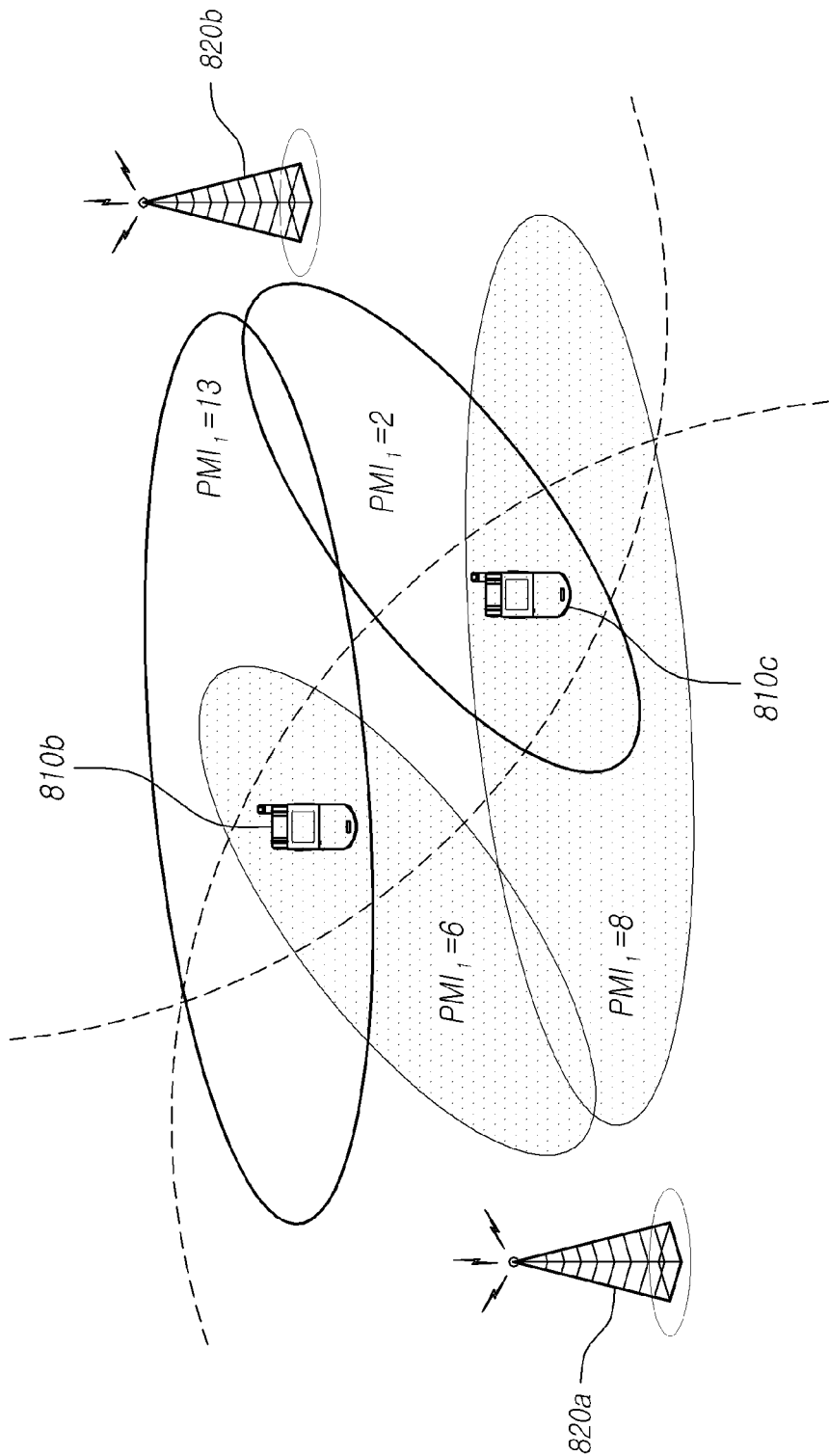

FIGS. 8 through 10 are conceptual diagrams illustrating a process of controlling inter-cell interference using a codebook restriction scheme in a wireless communication system according to embodiments of the present invention.

Referring to FIG. 8, inter-cell interference may occur among cell edge user equipments 810a through 810d during beamforming. For example, user equipments 810a and 810b exist in a coverage of a first base station and a second base station as shown in FIG. 8 and thus, when a signal is transmitted that is precoded based on a first precoding matrix associated with a $PMI_1=4$ or $PMI_1=6$ of the first base station of a first cell 820a, transmission of a signal that is precoded based on a first precoding matrix associated with a $PMI_1=13$ of the second base station or a second cell 820b may cause interference.

In other words, the user equipments 810a and 810b receive both the transmitted signal that is precoded based on the first precoding matrix associated with the $PMI_1=4$ or $PMI_1=6$ of the first base station or the first cell 820a and the transmitted signal that is precoded based on the first precoding matrix associated with a $PMI_1=13$ of the second base station or the second cell 820b and thus, interference may occur.

Also, user equipments 810c and 810d exist in a coverage of the first base station and the second base station as shown in FIG. 8 and thus, when a signal is transmitted that is precoded based on a first precoding matrix associated with a $PMI_1=8$ of the first base station 820a, transmission of a signal that is precoded based on a first precoding matrix associated with a $PMI_1=2$ or a $PMI_1=11$ of the second base station 820b may cause interference.

The descriptions may be specifically provided using the user equipment 810b as an example as follows. The user equipment 810b receives a signal from both the first base station 820a and the second base station 820b as shown in FIG. 8. The first base station 820a transmits a signal using the first precoding matrix corresponding to the $PMI_1=6$ to transmit a signal to the user equipment 810b, and the second base station 820b uses the first precoder matrix corresponding to the $PMI_1=13$ to transmit a signal to the user equipment 810b. Accordingly, as illustrated in FIG. 8, when the second base station 820b transmits a signal to the user equipment 810b using the $PMI_1=13$, another user equipment 810a may receive multiple-access interference by the signal transmitted to the user equipment 810b.

When the second base station 820b restricts a codebook so that the first precoder matrix corresponding to the $PMI_1=13$ is not to be used, the user equipment 810b receives a signal from only the first base station 820a and thus, inter-cell interference due to multiple-interference may be prevented in advance.

Other user equipments 810c and 810d may receive multiple-access interference due to inter-cell interference, like the user equipments 810a and 810b.

When the first base station 820a restricts a codebook so that the first precoder matrix corresponding to the $PMI_1=8$ is not to be used, user equipments 810c and 810d receive a signal from only the second base station 820b and thus, inter-cell interference due to multiple-interference may be prevented in advance.

FIG. 9 conceptually illustrates a case in which a first precoding matrix or an associated index that is expected to cause inter-cell interference is restricted by performing a codebook restriction based on the above-mentioned scheme, and a downlink MIMO is performed based on the restriction.

Referring to FIG. 9, when each base station 820a and 820b performs a $PMI_1=13$ based codebook restriction that restricts the use of a first precoding matrix corresponding to a $PMI_1=13$ or a $PMI_1=8$, occurrence of inter-cell interference may be avoided or reduced as illustrated in FIG. 9. Therefore, when a codebook restriction is applied to only a $PMI_1$ and is not applied to a $PMI_2$, inter-cell interference may be removed.

Referring to FIG. 10, the user equipment 810b receives signals precoded based on a first precoding matrix associated with a $PMI_1=6$ of a first base station and a first precoding matrix associated with a $PMI_1=13$ of a second base station and thus, interference may occur. The user equipment 810c receives signals precoded based on a first precoding matrix associated with a $PMI_1=8$ of the first base station and a first precoding matrix associated with a $PMI_1=2$ of the second base station and thus, interference may occur. In this example, the first base station may allow the use of the $PMI_1=6$ and may restrict the use of the $PMI_1=2$, and conversely, the second base station may allow the use of the $PMI_1=2$ and may restrict the use of the $PMI_1=6$ and thus, interference between user equipments may be removed.

As another example, to remove interference between user equipments, the first base station may allow the use of the $PMI_1=8$ and may restrict the use of the $PMI_1=13$, and conversely, the second base station may allow the use of the $PMI_1=13$ and may restrict the use of the $PMI_1=8$.

As another example, to remove interference between user equipments, the first base station may allow the use of the $PMI_1=6$ and the $PMI_1=8$ and the second base station may restrict the use of the $PMI_1=6$ and the $PMI_1=8$. Conversely, the first base station may restrict the use of the $PMI_1=6$ and the $PMI_1=8$ and the second base station may allow the use of the $PMI_1=6$ and the $PMI_1=8$.

As described in the foregoing, when each base station 820a and 820b performs the $PMI_1$ based codebook restriction, occurrence of inter-cell interference may be avoided or reduced.

Also, when codebook restriction is applied with respect to only the $PMI_2$, there is an advantage in that a codebook is restricted by a small number of bits. Also, no restriction is applied to the $PMI_1$ that directly controls a precoding gain and thus, more precise precoding is available and a size of a codebook may be reduced.

Although the embodiments of the present invention have been described in detail, the present invention may not be limited thereto.

The embodiments of the present invention may be applied to an up/downlink MIMO system, and may be applied to all up/downlink MIMO systems such as a Coordinated multi-point transmission/reception system (CoMP), a heterogeneous network, and the like, in addition to a single cell environment.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A communication method of a transmitting device including a first precoder and a second precoder, the method comprising:

determining a first bit sequence to restrict at least one precoding matrix from a first precoding matrix group, each bit of the first bit sequence corresponding to one precoding matrix of the first precoding matrix group, respectively, and the at least one precoding matrix of the first precoding matrix group being restricted from being used as a precoding matrix of the first precoder;

determining a second bit sequence to restrict at least one precoding matrix from a second precoding matrix group, each bit of the second bit sequence corresponding to one precoding matrix of the second precoding matrix group, respectively, and the at least one precoding matrix of the second precoding matrix group being restricted from being used as a precoding matrix of the second precoder; and transmitting, to a receiving device, codebook restricting information including at least one of the first bit sequence and the second bit sequence, receiving, from the receiving device, information relating to the precoding matrix of the first precoder and information relating to the precoding matrix of the second precoder, and wherein a period of receiving the information relating to the precoding matrix of the first precoder and a period of receiving the information relating to the precoding matrix of the second precoder are different from each other.

2. The method of claim 1, further comprising:

precoding data symbols through the first precoder and the second precoder using the precoding matrix of the first precoder and the precoding matrix of the second precoder; and transmitting the precoded data symbols, wherein the information relating to the precoding matrix of the first precoder and the information relating to the precoding matrix of the second precoder correspond to channel status information.

3. The method of claim 1, wherein the first matrix group includes N precoding matrices, and the first bit sequence is an N-bit sequence, where N is an integer.

4. The method of claim 1, wherein the use of precoding matrices for the second precoder that make pairs with restricted precoding matrices of the first matrix group is restricted based on the first bit sequence, and the use of precoding matrices for the first precoder that make pairs with restricted precoding matrices of the second matrix group is restricted based on the second bit sequence.

5. The method of claim 1, wherein the transmitting device includes at least one antenna pair in which a first domain including at least one antenna polarized in one direction and a second domain including at least one antenna polarized in another direction intersect each other; and the precoding matrix of the first precoder performs precoding on the first domain and the second domain, separately, and the precoding matrix of the second precoder performs phase mismatch correction to remove an effect from a phase mismatch between the first domain and the second domain.

6. The method of claim 5, wherein the precoding matrix of the first precoder corresponds to W1 in the following Equation, and the precoding matrix of the second precoder corresponds to W2 in the following Equation:

$$W = \underbrace{\begin{pmatrix} R_0 & 0 \\ 0 & R_0 \end{pmatrix}}_{W_1} \underbrace{\begin{pmatrix} I \\ \Lambda \end{pmatrix}}_{W_2},$$

wherein $R_0$ denotes a value determined by a precoding gain when the first domain and the second domain have an identical spatial channel status, I denotes a unit matrix, and $\Lambda$ denotes a phase mismatch correction value between the first domain and the second domain.

7. The method of claim 5, wherein a number of the antenna pairs corresponds to 4.

8. The method of claim 1, wherein the period of receiving the information relating to the precoding matrix of the first precoder is longer than the period of receiving the information relating to the precoding matrix of the second precoder.

9. A transmitting device, the device comprising:
a layer mapper to map a codeword to a layer;
a precoder configured to precode a data symbol corresponding to the codeword mapped to the layer by the layer mapper, the precoder precoding the data symbol using a precoding matrix of a first precoder and a precoding matrix of a second precoder selected from corresponding codebooks; and
an antenna array to transmit, to a receiving device, at least one of a first bit sequence and a second bit sequence, to receive, from the receiving device, information relating to the precoding matrix of the first precoder and information relating to the precoding matrix of the second precoder, and to transmit signals output from the precoder,
wherein the first bit sequence restricts at least one precoding matrix from a first precoding matrix group, the at least one precoding matrix of the first precoding matrix group being restricted from being used as the precoding matrix of the first precoder,
wherein the second bit sequence restricts at least one precoding matrix from a second precoding matrix group, the at least one precoding matrix of the second precoding matrix group being restricted from being used as the precoding matrix of the second precoder,
wherein each bit of the first bit sequence corresponds to one precoding matrix of the first precoding matrix group, respectively, and each bit of the second bit sequence corresponds to one precoding matrix of the second precoding matrix group, respectively, and
wherein a period of receiving the information relating to the precoding matrix of the first precoder and a period of receiving the information relating to the precoding matrix of the second precoder are different from each other.

10. The device of claim 9, wherein the information relating to the precoding matrix of the first precoder and the information relating to the precoding matrix of the second precoder correspond to channel status information.

11. The device of claim 9, wherein the first matrix group includes N precoding matrices, and the first bit sequence is an N-bit sequence, where N is an integer.

12. The device of claim 9, wherein the use of precoding matrices for the second precoder that make pairs with restricted precoding matrices of the first matrix group is restricted based on the first bit sequence, and the use of precoding matrices for the first precoder that make pairs with restricted precoding matrices of the second matrix group is restricted based on the second bit sequence.

13. The device of claim 9, wherein the antenna array includes at least one antenna pair in which a first domain including at least one antenna polarized in one direction and a second domain including at least one antenna polarized in another direction intersect each other; and
the precoding matrix of the first precoder performs precoding on the first domain and the second domain, separately, and the precoding matrix of the second precoder performs phase mismatch correction to remove an effect from a phase mismatch between the first domain and the second domain.

14. The device of claim 13, wherein the precoding matrix of the first precoder corresponds to W1 in the following Equation, and the precoding matrix of the second precoder corresponds to W2 in the following Equation:

$$W = \underbrace{\begin{pmatrix} R_0 & 0 \\ 0 & R_0 \end{pmatrix}}_{W_1} \underbrace{\begin{pmatrix} I \\ \Lambda \end{pmatrix}}_{W_2},$$

wherein $R_0$ denotes a value determined by a precoding gain when the first domain and the second domain have an identical spatial channel status, I denotes a unit matrix, and $\Lambda$ denotes a phase mismatch correction value between the first domain and the second domain.

15. The device of claim 13, wherein the first domain and the second domain intersect each other.

16. The device of claim 13, wherein a number of the antenna pairs corresponds to 4.

17. A communication method of a receiving device in a wireless communication system, the method comprising:
receiving codebook restricting information including at least one of a first bit sequence to restrict at least one precoding matrix from a first precoding matrix group and a second bit sequence to restrict at least one precoding matrix from a second precoding matrix group, each bit of the first bit sequence corresponding to one precoding matrix of the first precoding matrix group, respectively, the at least one precoding matrix of the first precoding matrix group being restricted from being used as a precoding matrix of a first precoder, each bit of the second bit sequence corresponding to one precoding matrix of the second precoding matrix group, respectively, and the at least one precoding matrix of the second precoding matrix group being restricted from being used as a precoding matrix of a second precoder; and
transmitting, to a transmitting device, $1^{st}$ channel status information indicating the precoding matrix of the first precoder and $2^{nd}$ channel status information indicating the precoding matrix of the second precoder, the precoding matrix of the first precoder and the precoding matrix of the second precoder being selected, based on the codebook restricting information, from among precoding matrices that are not restricted,
wherein a period of transmitting the information relating to the precoding matrix of the first precoder and a period of transmitting the information relating to the precoding matrix of the second precoder are different from each other.

18. The method of claim 17, wherein the first matrix group includes N precoding matrices, and the first bit sequence is an N-bit sequence, where N is an integer.

19. The method of claim 17, wherein the use of precoding matrices for the second precoder that make pairs with restricted precoding matrices of the first matrix group is restricted based on the first bit sequence, and the use of precoding matrices for the first precoder that make pairs with restricted precoding matrices of the second matrix group is restricted based on the second bit sequence.

20. The method of claim 17, wherein the transmitting device includes at least one antenna pair in which a first domain including at least one antenna polarized in one direction and a second domain including at least one antenna polarized in another direction intersect each other; and the precoding matrix of the first precoder performs precoding on the first domain and the second domain, separately, and the precoding matrix of the second precoder performs phase mismatch correction to remove an effect from a phase mismatch between the first domain and the second domain.

21. The method of claim 20, wherein the precoding matrix of the first precoder corresponds to W1 in the following Equation and the precoding matrix of the second precoder corresponds to W2 in the following Equation:

$$W = \underbrace{\begin{pmatrix} R_0 & 0 \\ 0 & R_0 \end{pmatrix}}_{W_1} \underbrace{\begin{pmatrix} I \\ \Lambda \end{pmatrix}}_{W_2},$$

wherein $R_0$ denotes a value determined by a precoding gain when the first domain and the second domain have an identical spatial channel status, I denotes a unit matrix, and $\Lambda$ denotes a phase mismatch correction value between the first domain and the second domain.

22. The method of claim 17, wherein the period of transmitting the information relating to the precoding matrix of the first precoder is longer than the period of transmitting the information relating to the precoding matrix of the second precoder.

23. A receiving device in a wireless communication system, the receiving device comprising:

an antenna array to receive, as codebook restricting information, at least one of a first bit sequence to restrict at least one precoding matrix from a first precoding matrix group and a second bit sequence to restrict at least one precoding matrix from a second precoding matrix group, each bit of the first bit sequence corresponding to one precoding matrix of the first precoding matrix group, respectively, the at least one precoding matrix of the first precoding matrix group being restricted from being used as a precoding matrix of a first precoder, each bit of the second bit sequence corresponding to one precoding matrix of the second precoding matrix group, respectively, and the at least one precoding matrix of the second precoding matrix group being restricted from being used as a precoding matrix of a second precoder; and a channel information feedback device to transmit, to a transmitting device, information relating to the precoding matrix of the first precoder and information relating to the precoding matrix of the second precoder, the precoding matrix of the first precoder and the precoding matrix of the second precoder being selected, based on the codebook restricting information, from among precoding matrices that are not restricted, wherein a period of transmitting the information relating to the precoding matrix of the first precoder and a period of transmitting the information relating to the precoding matrix of the second precoder are different from each other.

24. The device of claim 23, wherein the first matrix group includes N precoding matrices, and the first bit sequence is an N-bit sequence, where N is an integer.

25. The device of claim 23, wherein the use of precoding matrices for the second precoder that make pairs with restricted precoding matrices of the first matrix group is restricted based on the first bit sequence, and the use of precoding matrices for the second precoder that make pairs with restricted precoding matrices of the second matrix group is restricted based on the second bit sequence.

26. The device of claim 23, wherein the transmitting device includes at least one antenna pair in which a first domain including at least one antenna polarized in one direction and a second domain including at least one antenna polarized in another direction intersect each other; and the precoding matrix of the first precoder performs precoding on the first domain and the second domain, separately, and the precoding matrix of the second precoder performs phase mismatch correction to remove an effect from a phase mismatch between the first domain and the second domain.

27. The device of claim 26, wherein the precoding matrix of the first precoder corresponds to W1 in the following Equation, and the precoding matrix of the second precoder corresponds to W2 in the following Equation:

$$W = \underbrace{\begin{pmatrix} R_0 & 0 \\ 0 & R_0 \end{pmatrix}}_{W_1} \underbrace{\begin{pmatrix} I \\ \Lambda \end{pmatrix}}_{W_2},$$

wherein $R_0$ denotes a value determined by a precoding gain when the first domain and the second domain have an identical spatial channel status, I denotes a unit matrix, and $\Lambda$ denotes a phase mismatch correction value between the first domain and the second domain.

28. The device of claim 23, wherein the period of transmitting the information relating to the precoding matrix of the first precoder is longer than the period of transmitting the information relating to the precoding matrix of the second precoder.

* * * * *